Oct. 7, 1924.  
G. I. STADEKER  
1,510,509  
CLEANER OR WIPER FOR WINDSHIELDS AND THE LIKE  
Filed Aug. 1, 1921
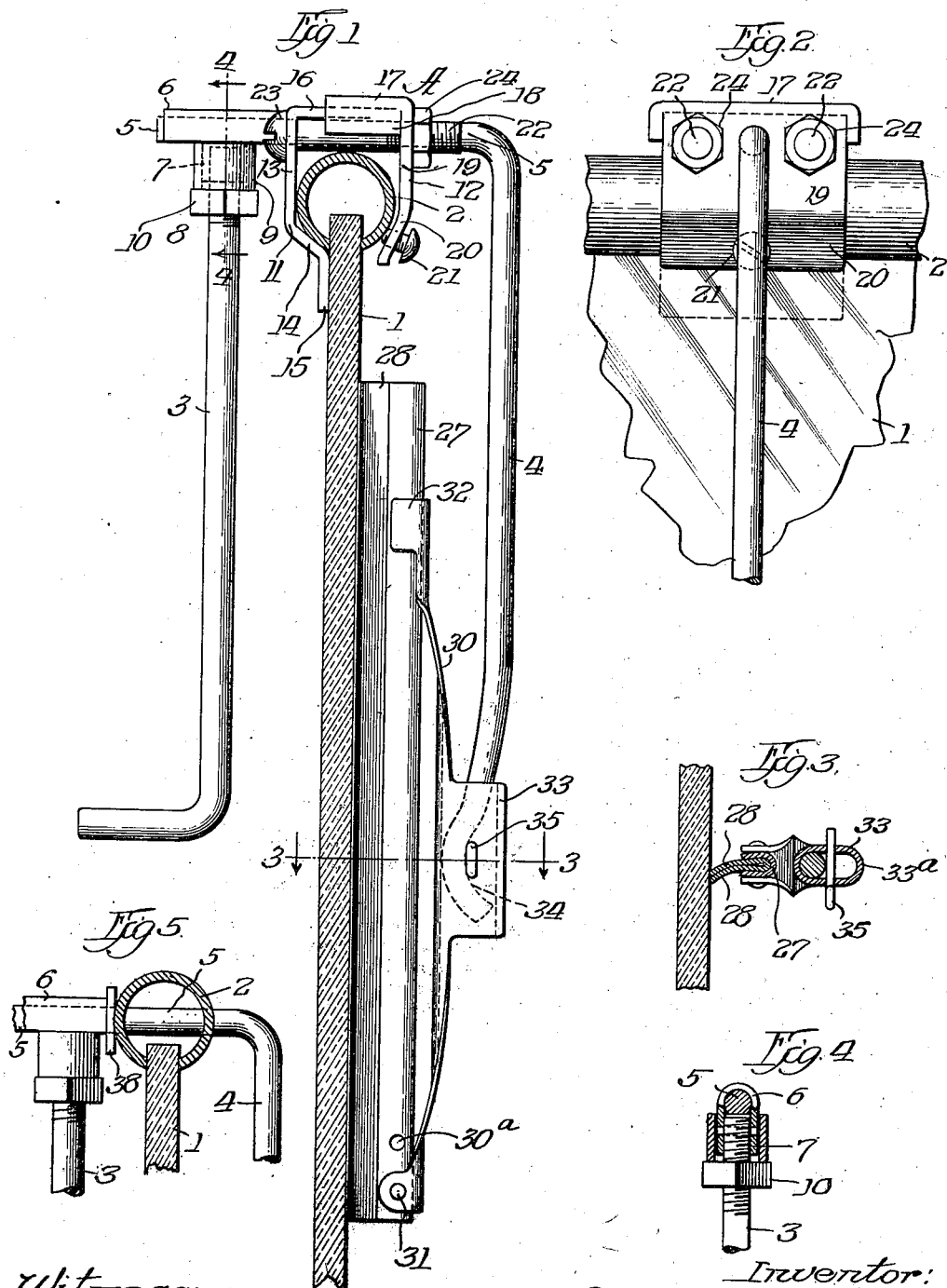
Inventor:  
Gilbert I. Stadeker Patented Oct. 7, 1924.

1,510,509

UNITED STATES PATENT OFFICE.

GILBERT I. STADEKER, OF CHICAGO, ILLINOIS.

CLEANER OR WIPER FOR WINDSHIELDS AND THE LIKE.

Application filed August 1, 1921. Serial No. 488,798.

*To all whom it may concern:*

Be it known that I, GILBERT I. STADEKER, a citizen of the United States, residing at Chicago, in the county of Cook and State of Illinois, have invented a certain new and useful Improvement in Cleaners or Wipers for Windshields and the like, of which the following is a full, clear, concise, and exact description, reference being had to the accompanying drawings, forming a part of this specification.

My invention relates to cleaners or wipers for wind shields and the like.

One of the objects of the invention is to provide a simple, practical and effective form of wind shield cleaner.

Another object of the invention is to arrange for the ready attachment of the wiper or cleaner to the wind shield and the ready detachment of the same therefrom.

Another object of the invention is to provide a wind shield wiper which can be used on all types of wind shields.

Another object of the invention is to arrange for a tight and effective attachment of the wiper to the wind shield and to secure adjustment so that the attachment may be made as tight and secure as desired.

Another object of the invention is to secure a uniform pressure of the wiping member to the wind shield glass or other surface to be cleaned.

Another object of the invention is to arrange to apply the pressure of the wiping member to the glass without requiring undue pressure on the handle or other part of the device.

Another object of the invention is to secure flexibility in the material forming the wiping member.

In the accompanying drawings Fig. 1 is a view showing part of a wind shield of an open automobile and a wiper embodying my present invention applied thereto;

Fig. 2 is an end elevation of the principal portion of the wiping device and said wind shield;

Figs. 3 and 4 are cross sections taken respectively on lines 3—3 and 4—4 in Fig. 1;

Fig. 5 is a view showing the device applied to a closed car.

Referring to the drawings, I show a wind shield having a glass 1 and a rim 2 extending along the upper edge of the glass 1. Mounted on this wind shield is a wiper A embodying my present invention.

This wiper A has a handle 3 to be grasped by the hand of the operator or person driving the automobile and a wiper arm 4 on the side of the wind shield opposite to the handle 3. A cross member 5 extends between the handle 3 and arm 4, said member 5 being preferably made as part of the wiper arm or support 4.

For securing the member 5 to the handle 3, I show the latter provided at its upper end with an elongated bearing or sleeve 6 adapted to enclose the end portion of the member 5. The member 5 may move in the bearing 6 but it is normally clamped firmly therein, as will appear from the construction hereinafter described. Said member 5 may be removed from bearing 6 when desired to remove the device from the wind shield or for other purposes. This bearing 6 has a downwardly extending socket portion 7 which receives the end 8 of the handle 3, said end 8 being secured in said socket 7, as by welding. A ring 9 is fitted over the socket 7, having a sliding connection therewith, and a nut 10 is arranged on the threaded end 8, whereby by screwing the nut upwardly the ring 9 will be forced and clamped against the exposed under surface of the member 5, it being understood that the sleeve 6 has its lower side made open, as shown in Fig. 4. Thus the handle 3 may be readily attached to the cross member 5 and held firmly in position in connection with the same, and may be as readily detached from the same.

The cross member 5 is mounted so that it may be turned as the handle 3 is swung to one side or the other when operating the device. To such end I show two clamping members 11 and 12 mounted on opposite sides of the wind shield. The member 11 has an upper straight portion 13 which lies alongside the wind shield rim 2 and also has an angular portion 14 which extends along the under side of said rim and also has a substantially vertical flat portion 15 adapted to fit against and contact with the upper surface of the glass 1. The clamping member 11 also has a horizontal portion 16 at its upper end extending crosswise of the portion 13 and preferably substantially at right angles thereto. The clamping member 12 has a horizontal portion 17 arranged above the horizontal portion 16 of the member 11 and arranged to lie immediately above and in contact with the same. The ends of this portion 17 are turned down as at 18 so that they come down along the end edges of the portion 16 and grasp or hold said portion between them and thereby hold the clamping members against longitudinal movement. The member 12 also has a vertical portion 19 and an angular portion 20, the latter adapted to come into position opposite the other under side of the wind shield rim 2. An adjusting screw 21 passes through the portion 20 and comes in contact with the rim 2.

A pair of screw bolts 22—22 pass through the clamping members 11 and 12, the heads 23 of said bolts engaging the outer side of the portion 13 of the clamping member 11 and nuts 24 on said bolts 22—22 engaging the outer side of the vertical portion 19 of the clamping member 12. The horizontal connecting member 5 passes through the clamping members 11 and 12 between the bolts 22—22, as shown in Fig. 2. By adjusting the nuts 24 on the bolts 22 the clamping members 11 and 12 may be brought together and clamped upon the wind shield rim, and by adjusting the screw 21 pressure may be applied to the rim 2 to supplement this clamping action and so hold the cleaning device as a whole firmly and securely upon the wind shield.

At the lower end of the wiper arm 4 a wiper member 27 is mounted. This member 27 is preferably in the form of a metallic holder having two thicknesses 28—28 of flexible rubber material secured to it and between its opposite sides, as best seen in Fig. 3. By having two thicknesses 28 both comparatively thin, the wiping material is more flexible and a better cleaning action is secured.

The mounting between the wiper member 27 and the wiper arm 4 is preferably such as to permit uniform pressure throughout the entire length of the member 27 and also to permit a certain amount of rolling or flapping action on the part of the wiper member so as to secure effective cleaning. In the arrangement shown the wiper member 27 is supported by a spring member 30 preferably in the form of a bow-shaped or arched metallic member. The wiper member 27 is secured as by a pivot 31 to the lower end of the member 30, whereas the upper end 32 of the member 30 is flanged so as to grip or engage the member 27 on opposite sides, there being a sliding joint between the member 27 and end 32. The member 30 has a channel shaped central portion 33, best shown in Fig. 3, in which the lower end of the arm 4 is fitted, said end 4 being curved as a 34 and provided with a cross pin 35 to hold said end 34 in position. The end 34 is loose enough in the part 33, however, to permit a certain amount of rolling or flapping action of the member 30 with reference to the arm 34. Thus the joint or connection between arm 4 and wiper member 27 through the medium of arch-shaped spring 30, permits pressure to be applied to the wiper at separated points, as for example nearly at the opposite ends of the same, as shown. This distributes the pressure evenly along the entire length of the wiping member which would not be the case if said member were supported and acted upon only at its middle or central point. Adjustment of the pressure is permitted by a sliding connection between end 32 and member 27. Furthermore, the duplex wiping members 28 and the rolling action of member 30 with reference to arm 34 allow a very effective cleaning action. The channel portion 33 preferably has its outer side closed, as by wall 33ª, so that the end of hook 34 may strike against same to limit the outward movement of said hook end 34. If desired, the member 30 may be turned upside down as compared with its position in Fig. 1, in which case the wiper 28 will extend farther down on the glass because of its projection farther beyond the sliding connection 32.

Furthermore, there may be one or more additional apertures 30ª for pin 31, to permit mounting member 27 in different vertical adjustments.

Thus it will be seen that the device may be firmly secured upon the upper edge or rim of the wind shield and also that sufficient pressure may be obtained to apply sufficient pressure to the cleaning member 27 to insure effective cleaning action. Also that since handle 3 is adjustable on connection 5, further pressure may be secured if desired by adjusting said handle toward arm 4, with result that wiper 28 will be pressed closer on wind shield glass.

In Fig. 5 the device is shown applied to a closed car, in which case the clamping members 11 and 12 are omitted and the connecting member 5 passes directly through the wind shield rim 2. A washer 38 is preferably provided on the side of the rim 2 next to the handle 3.

It will be understood that changes and modifications may be made without departing from the spirit of the invention.

What I claim is:

1. A wind shield wiper for automobiles and the like, comprising a wiper body, a body supporting arm, said body and arm being arrangeable upon the outside of the wind shield, a handle member arrangeable upon the inside of the wind shield, connections between said handle and said arm to cause conjoint movement thereof, and a clamp forming a bearing for said connection and adapted to embrace the top part of the frame of the wind shield, said clamp comprising a pair of sheet metal members formed with substantially flat overlying horizontal flanges, vertical parallel flanges at the opposite side edges of the horizontal flanges and inwardly extending portions at the bottom of said clamp members for engaging beneath the frame part, together with clamping bolts arrangeable through the two vertical portions of said clamping parts.

2. A wind shield wiper for automobiles and the like, comprising a wiper body, a body supporting arm, said body and arm being arrangeable upon the outside of the wind shield, a handle member arrangeable upon the inside of the wind shield, connections between said handle and said arm to cause conjoint movement thereof, and a clamp forming a bearing for said connections and adapted to embrace the top part of the frame of the wind shield, said clamp comprising, a pair of sheet metal members having upright parts spaced apart and adapted for disposition on opposite sides of a wind shield frame part and apertured to receive said connection, inwardly extending substantially flat horizontal portions arrangeable above said connection, bolts disposed through said upright parts and adapted to bear against the top of the wind shield frame part, the lower portions of said upright parts being disposed inwardly and under said wind shield frame parts.

3. A wind shield wiper, comprising, a wiper arm, a squeegee mounted on said arm and adapted to sweep over the glass of said wind shield, said mounting means including a bowed spring member pivoted intermediate its ends to said arm, said spring member having one end attached to the squeegee and its other end slidably engaging the squeegee.

4. A wind shield wiper, comprising a wiper arm, a squeegee mounted on said arm and adapted to sweep over the glass of the wind shield, and a yielding yoke pivoted at one end to said squeegee engaged with said operating arm and having its other end slidably engaged with said squeegee.

5. A wind shield wiper, comprising a wiper arm, a squeegee mounted on said arm and adapted to sweep over the glass of the wind shield, and a yoke pivoted at one end to the squeegee and having its other end bearing thereagainst, a connection between said operating arm and said yoke located at one side of the longitudinal center of the squeegee, said connection being reversible to permit the location of the squeegee in different positions with respect to the frame of the wind shield.

6. A wind shield wiper, comprising a wiper arm, a squeegee mounted on said arm and adapted to sweep over the glass of the wind shield, and a spring member fast at one end to the squeegee and having sliding connection at its other end, said spring member having a socket part intermediate its ends loosely receiving the operating member.

7. A wind shield wiper, comprising a wiper arm, a squeegee mounted on said arm and adapted to sweep over the glass of the wind shield, and a spring member engaging at its ends said squeegee and connected to said arm to permit limited universal movement of said spring member with respect to said arm.

8. A wind shield wiper, comprising a wiper arm, a squeegee mounted on said arm and adapted to sweep over the glass of the wind shield, and a yoke of sheet metal having ends provided with lips extending down for engagement with the sides of the squeegee and its center bent up and formed to provide for engagement with said operating arm.

In witness whereof, I hereunto subscribe my name this 28th day of June, A. D., 1921.

GILBERT I. STADEKER.